United States Patent [19]
Moore et al.

[11] 3,809,062

[45] May 7, 1974

[54] COOKING SYSTEM

[75] Inventors: Lewis Frank Moore; George McNair Price, both of Shreveport, La.

[73] Assignee: The Frymaster Corporation, Shreveport, La.

[22] Filed: Feb. 4, 1972

[21] Appl. No.: 223,443

[52] U.S. Cl. ............... 126/369, 126/350 R, 99/374, 126/373
[51] Int. Cl. .......................................... A47j 27/00
[58] Field of Search........ 431/171, 347, 350 R, 175; 126/369, 373, 390; 99/374; 239/543; 432/210

[56] References Cited
UNITED STATES PATENTS

| | | | |
|---|---|---|---|
| 2,569,112 | 9/1951 | Miller et al. | 126/345 X |
| 2,978,975 | 4/1961 | Rossi | 126/374 X |
| 3,314,416 | 4/1967 | Wagner | 126/369 |
| 2,310,116 | 2/1943 | Ratcliff | 431/347 |
| 2,125,862 | 8/1938 | Ratcliff | 126/390 X |
| 1,996,434 | 2/1935 | O'Dowd | 126/390 X |
| 3,291,185 | 12/1966 | McIntosh et al. | 431/350 R |
| 3,217,633 | 11/1965 | Anetsberger | 126/390 |
| 2,124,186 | 7/1938 | Childs | 126/390 |

Primary Examiner—William E. Wayner
Assistant Examiner—William C. Anderson

[57] ABSTRACT

A cooking system includes a frypot comprising heat transfer walls which are spaced to facilitate cleaning of the frypot. Each heat transfer wall comprises a lower vertically extending portion and an upper outwardly curved portion shaped to cause wastes to flow to the bottom of the frypot. A plurality of burners are provided for maintaining combustion in zones adjacent to the vertically extending portions of the heat transfer walls. This causes heated products of combustion to flow upwardly along the vertically extending and outwardly extending portions of the heat transfer walls, whereby heat transfer is effected through the walls to cooking oil in the frypot. Each burner comprises two or more orifices for discharging mutually interacting gas jets and a target for deflecting the gas jets and entrained air toward the heat transfer walls and for reflecting heat into the combustion zone and through the heat transfer walls. Baffles are provided for preventing recycling of the products of combustion into the combustion zone and for maintaining the cooking oil in the bottom of the frypot relatively cool.

11 Claims, 6 Drawing Figures

PATENTED MAY 7 1974

COOKING SYSTEM

BACKGROUND AND SUMMARY OF THE INVENTION

This invention relates to a cooking system, and more particularly to a system for frying frozen or refrigerated foods and a burner which is especially adapted for use in cooking systems and similar applications.

As is well known, hamburger stands, fried chicken stands, and similar convenience restaurants usually sell various fried food items including French fried potatoes, fried fish, and the like. These items are typically supplied to a convenience restaurant in frozen form and are cooked at the restaurant directly from the frozen state, that is, without being first thawed or otherwise prepared for cooking. It is therefore necessary to equip each convenience restaurant with a system for frying frozen or refrigerated foods.

Although various frying systems suitable for use in convenience restaurants and the like have been proposed heretofore, a number of problems have remained unsolved. Thus, many prior art frozen food frying systems have comprised a frypot having fire tubes extending through its lower portion. Such a system achieves good heat transfer to cooking oil in the frypot but is inconvenient to clean because it is difficult to gain access to the area around the fire tubes in order to remove wastes and residues that have accumulated during cooking. One attempt to overcome this problem has been to provide an externally heated cooking container. However, many of the externally fired containers that have been proposed heretofore have not achieved efficient heat transfer and have therefore been relatively expensive to operate.

The present invention comprises a cooking system which overcomes the foregoing and other deficiencies that have long been associated with the prior art. In accordance with the broader aspects of the invention, a frypot includes heat transfer walls each comprising a lower vertically extending portion and an upper outwardly extending portion. Combustion is established in zones located adjacent the vertically extending portions so that heated products of combustion travel upwardly along the vertically extending and the outwardly extending portions of the heat transfer walls. By this means very efficient heat transfer is effected through the heat transfer walls to cooking oil in the frypot.

An imporatnt factor in the efficient heat transfer that is achieved in cooking systems employing the present invention is the vertical orientation of the lower portion of the heat transfer walls. It has been found that if a heat transfer wall for a frypot has a substantial horizontal component, a boundary layer of heated cooking oil tends to form along the wall, whereupon further heat transfer through the wall is retarded by the boundary layer. On the other hand, if the heat transfer wall is substantially vertical, circulation of the cooking oil due to natural convection continuously removes the boundary layer.

Another important aspect of the invention comprises a novel burner which is especially adapted for use in cooking systems and similar applications. The burner comprises structure for discharging two or more gas jets into a combustion zone in such directions that at least portions of the jets of gas and the air they entrain contact or intersect with each other. This causes turbulent intermixing of the gas with the ambient or secondary air. A target is positioned at least partially in the path of the interacting jets to deflect the jets and thereby cause futher intermixing of the gas and the air. The target also reflects heat into the combustion zone to increase the efficiency of the burner and also through the heat transfer walls.

In accordance with more specific aspects of the invention, the frypot comprises opposed heat transfer walls which are spaced to permit easy cleaning of the frypot. Baffles may be provided for retarding heat transfer into the portion of the frypot below the vertically extending portions of the heat transfer walls and thereby providing a relatively cool zone in the bottom of the frypot for receiving breading particles and other solid wastes that accumulate during cooking. Baffles are also mounted adjacent each heat transfer wall above the combustion zones and beneath the outwardly extending portion of the heat transfer walls for preventing recycling of the products of combustion into the combustion zones.

DESCRIPTION OF THE DRAWINGS

A more complete understanding of the invention may be had by referring to the following detailed description when taken in conjunction with the accompanying drawings, wherein.

DETAILED DESCRIPTION

Figure 1:
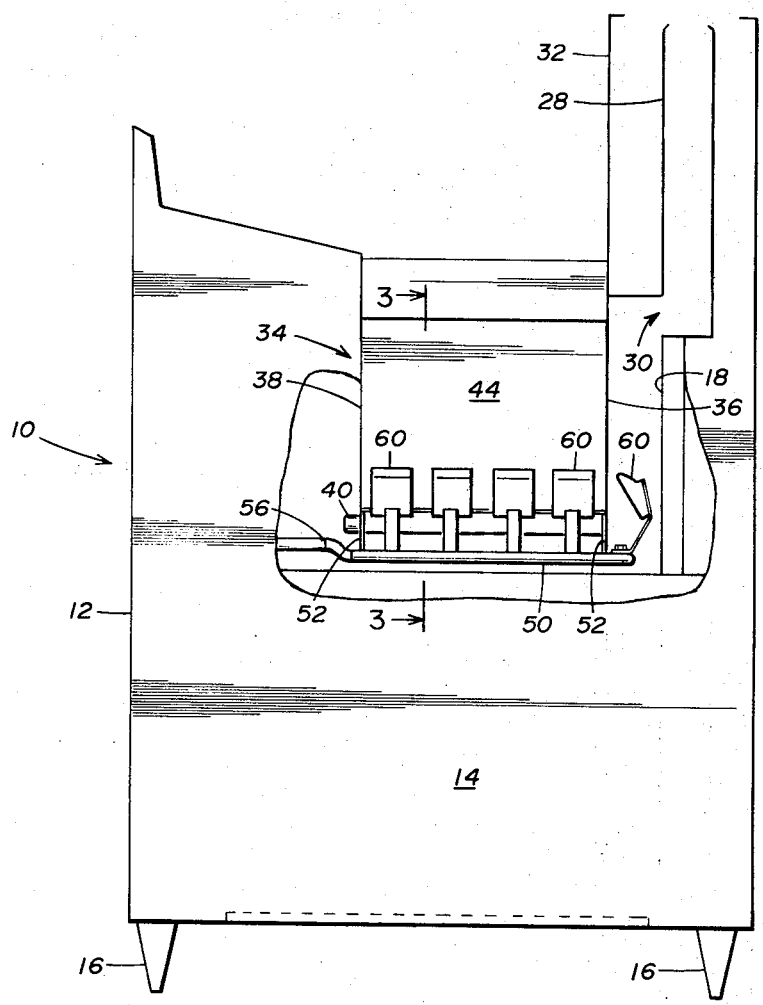
FIG. 1 is a side view of a cooking system incorporating the present invention in which certain parts have been broken away more clearly to illustrate certain features of the invention.
Figure 2:
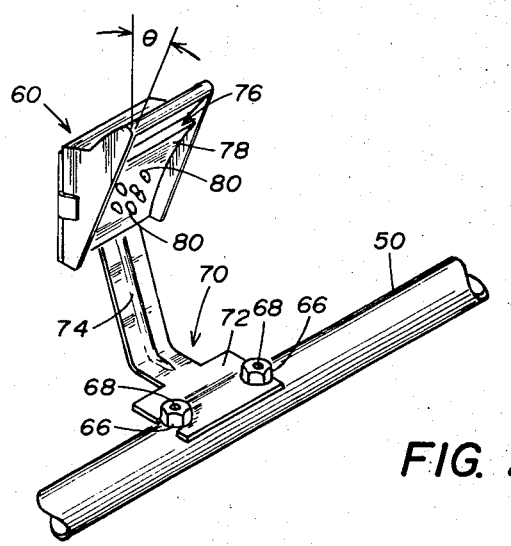
FIG. 2 is a perspective view of a burner incorporating the invention.
Figure 3:
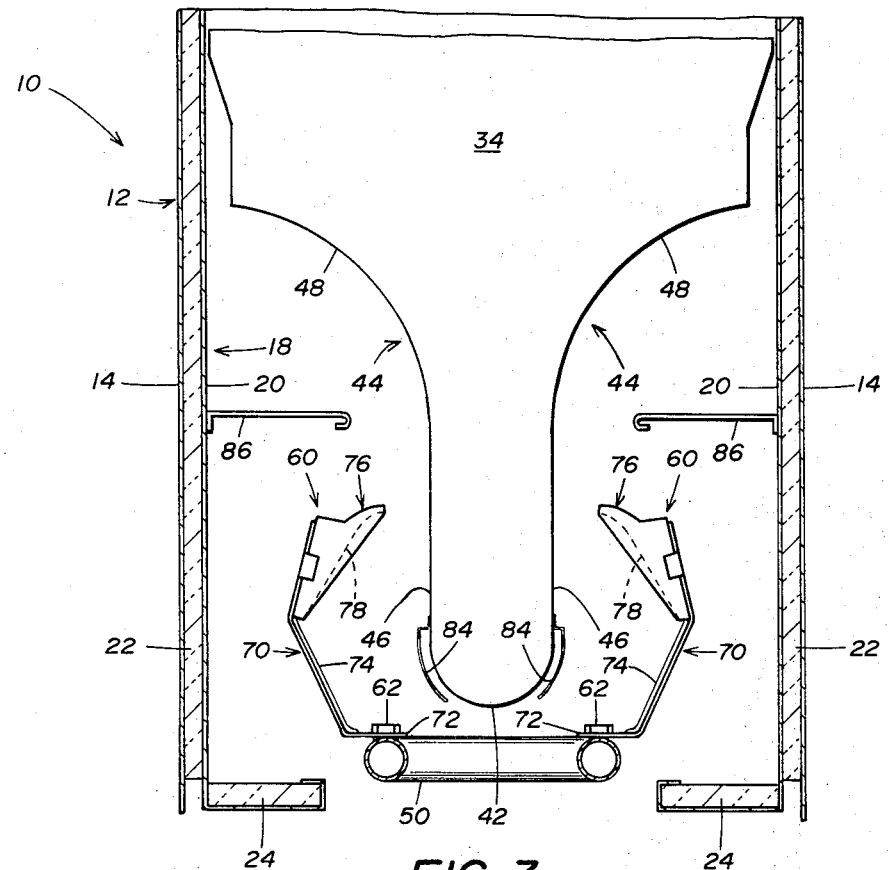
FIG. 3 is a sectional view taken generally along the line 3—3 in FIG. 1 in the direction of the arrows.

Referring now to the drawings, and particularly to FIG. 1, there is shown a cooking system 10 incorporating the invention. The cooking system 10 includes a housing 12 comprising outer panels 14 and supporting legs 16. As is best shown in FIG. 3, the housing 12 further includes a firebox 18 comprising inner panels 20. The panels 20 are separated from the panels 14 by thermal insulation layers 22 and support inwardly projecting members 24. The members 24 provide both thermal and acoustical insulation and serve to control air flow into the firebox 18.

Referring again to FIG. 1, the housing 12 comprises an inclined splash surface, not shown, at one end and a flue 28 at the other end. The flue 28 communicates with the firebox 18 by means of a flue inlet 30. A panel 32 extends adjacent the flue 28 and is advantageously employed following cooking to support cooking baskets for drainage.

A frypot 34 is mounted within the firebox 18 of the housing 12 to receive cooking oil or other cooking fluids. AS is best shown in FIG. 1, the frypot 34 includes a pair of vertical end walls 36 and 38. A normally closed drain 40 is mounted in the end wall 38 for use in cleaning the frypot 34.

Referring now to FIG. 3, the cross sectional configuration of the frypot 34 comprises a very important aspect of the present invention. The bottom portion 42 of the frypot 34 is semicylindrical in shape and is concentric with the drain (not shown in FIG. 3). A pair of heat transfer walls 44 extend generally upwardly and outwardly from the semicylindrical bottom portion 42. Each wall 44 includes a lower vertically extending portion 46 and an upper outwardly curved portion 48. The shape of the outwardly curved portions 48 of the walls 44 is very important in that it assures the flow of breading particles and other wastes and residues into the bottom portion 42 of the frypot 34.

Another very important aspect of the cross sectional configuration of the frypot 34 relates to the spacing of the heat transfer walls 44. The walls 44 are purposely separated by a sufficient distance to permit an adult hand to be fully inserted into the bottom portion 42 of the frypot 34. This greatly simplifies cleaning of the frypot and thereby materially reduces the amount of time that the frypot must be out of service in order to permit cleaning.

A gas supply manifold 50 is also mounted in the firebox 18 of the housing 12 of the cooking system 10. The manifold 50 is supported by brackets 52 which depend from the frypot 34. Suitable fuel for the cooking system 10, such as natural gas, propane, LP gas, etc. is admitted to the manifold 50 through an inlet 56.

As is best shown in FIG. 1, the gas supply manifold 50 supports a plurality of burners 60. The burners 60 are positioned at spaced points along the manifold 50 adjacent the heat transfer walls 44 and the end wall 36, and function to heat the contents of the frypot 34. As is conventional in the art, the operation of the burners 60 is preferably regulated by suitable control and safety systems which function to restrict and/or prevent the flow of fuel into the manifold 50 in accordance with particular parameters.

Figure 5:
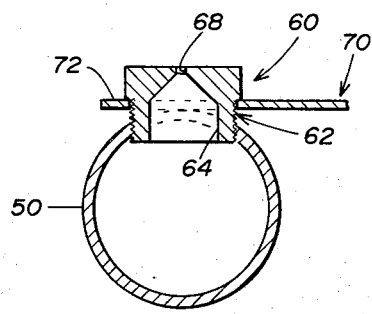
FIGS. 4 and 5 are enlargements of portions of FIG. 3.
Figure 6:
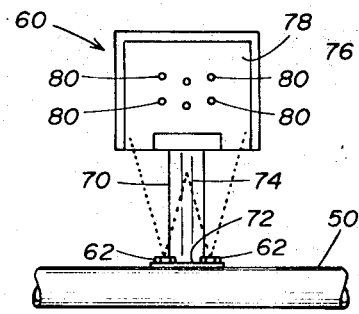
FIG. 6 is a front view of the burner shown in FIG. 3.

Referring now to FIGS. 5 and 6, each burner 60 includes a pair of orifices 62 which are threadably engaged with the gas supply manifold 50. Each orifice 62 comprises a relatively large inlet diameter bore 64, tapering to a relatively small outlet diameter orifice 69 formed at the upper end. Thus, during normal operation of the cooking system 10, gas flows out of each orifice 62 in the form of a relatively small diameter, relatively high velocity jet.

The orifices 62 of each burner 60 support a bracket 70. The bracket 70 typically comprises bifurcated (or multifurcated) portions 72 which receive and which are secured by the orifices 62. Each bracket 70 extends generally upwardly from its associated pair of orifices and includes a reinforcing rib 74 which prevents wilting of the bracket shape due to extended exposure to elevated temperatures.

Figure 4:
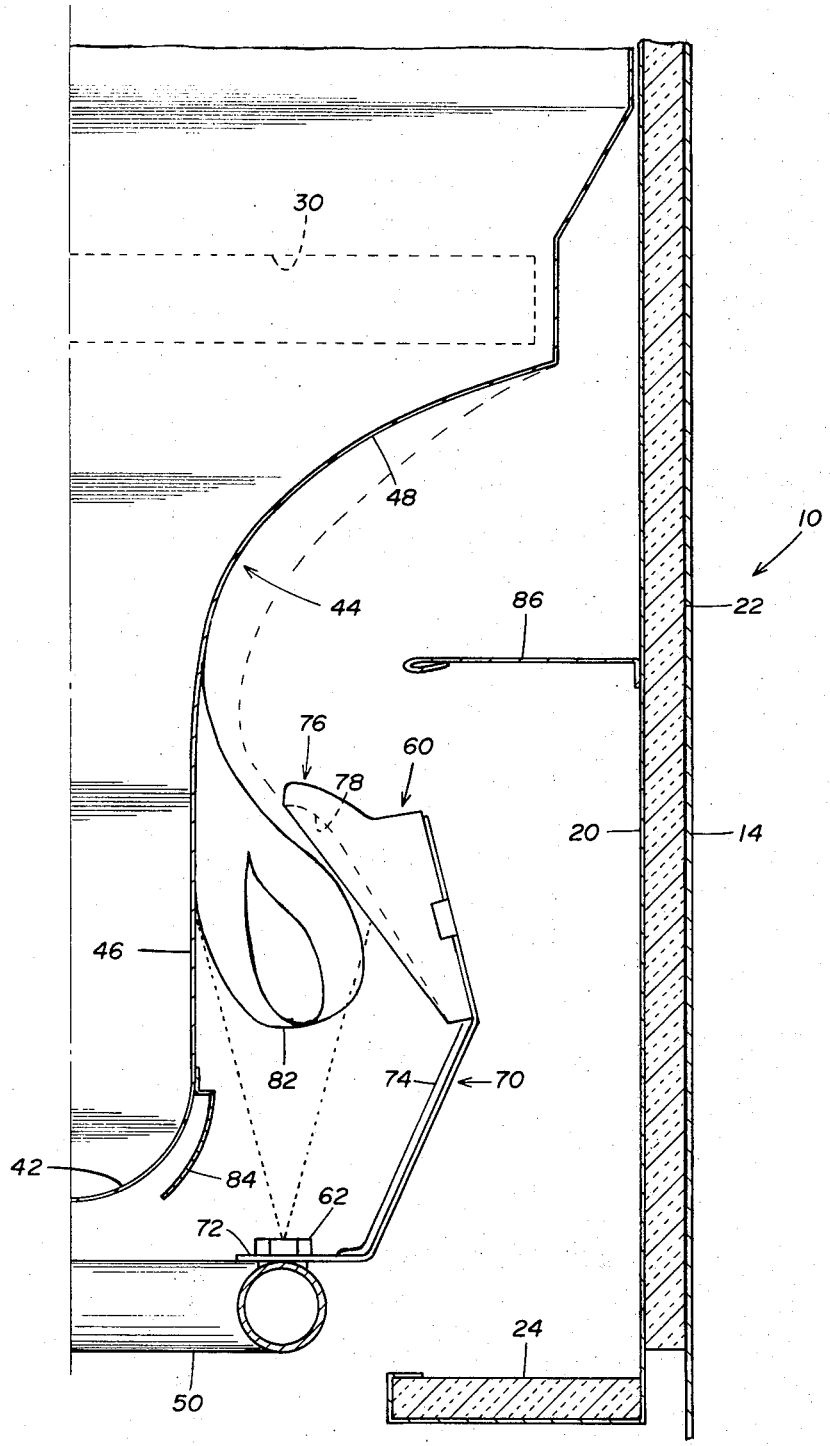

The brackets 70 in turn support targets 76 which are preferably formed from a ceramic or other heat resistant material. Each target 76 includes a face 78 extending at an angle $\Theta$ relative to the vertical and having a plurality of inwardly facing projections 80 formed on it. As is most clearly shown in FIG. 4, the face 78 of each target 76 comprises a substantially planar surface facing generally both toward its associated gas jets and toward the frypot 34.

During operation of the cooking system 10, the gas is discharged from the orifices 62 of the burners 60 in the undiluted state. That is, primary air is not mixed with the gas prior to discharge of the gas for combustion. This is very important because it eliminates the problem of clogging of the air shutters and venturi throats normally used due to lint or other foreign matter that is often carried into the gas stream with the primary air, affecting proper gas/air mixture and associated efficient and safe combustion, and thereby eliminates a serious maintenance problem that has frequently been encountered in the use of prior art burners.

The housing 12 of the cooking system 10 is adapted to admit ambient or secondary air to the vicinity of the burners 60. As is indicated by the dotted lines in FIG. 6, the orifices 62 of each burner 60 in the cooking system 10 are positioned closely adjacent one another so that some of the gas of each jet of each burner together with the air it entrains intersects with some of the gas/air mixture in another jet. This causes turbulent intermixing of the gas and the secondary air. Also, the target 76 of each burner 60 extends partially into the path of the jets of the burner in the manner indicated by the dotted lines in FIG. 4 and therefore deflects the jets towards the frypot 34 to cause further turbulent intermixing of the gas and the secondary air. By this means gas from the jets is thoroughly intermixed with secondary air to form a combustible mixture.

Combustion of the gas and air mixture occurs in a combustion zone 82 located adjacent the vertically extending portions of the heat transfer walls 44 of the frypot 34. The positioning of the orifices 62 of the burner 60, the inward deflection of the jets caused by the positioning of the targets 76, and the shape of the heat transfer walls 44 of the frypot 34 cooperate to cause heated products of this combustion to travel upwardly along the vertically extending portions and along the outwardly extending portions of the walls 44 in the manner indicated by the dashed lines in FIG. 4. The products of combustion then flow out of the cooking system 10 through the flue inlet 30 and the flue 28.

The vertical orientation of the lower portion of the heat transfer walls 44 of the frypot 34 comprises a very important aspect of the present invention. It has been found that if a frypot has been provided with heat transfer walls having a substantial horizontal orientation, heat transfer to cooking oil in the frypot is retarded by a boundary layer of heated oil which forms along the heat transfer wall. On the other hand, if heat transfer is effected through a substantially vertically extending wall, natural convection causes circulation of the oil in the frypot which tends to prevent the formation of such a boundary layer. For this reason heat transfer through a vertically extending heat transfer wall is considerably more efficient than heat transfer through a wall having a substantial horizontal component.

During combustion in the cooking system 10, the targets 76 of the burners 60 reflect heat into the combustion zones 82. By this means the temperature of combustion is raised substantially whereby the efficiency of the burners is markedly increased. It will therefore be understood that the targets 76 perform several very important functions in the operation of the burners 60, i.e., deflection of the gas jets to cause turbulent intermixing of the gas with secondary air, cooperation with the positioning of the gas jets and with the shape of the heat transfer walls to cause heated products of combustion to flow along the heat transfer walls, reflection of heat into the combustion zones to increase the efficiency of the burners, and radiating infra red energy into the frypot 44.

It will be appreciated that the spacing of the orifices 62 and the angle of inclination of the targets 76 is important to the proper operation of the burners 60. In actual practice it has been determined that when two orifices per burner are used, the most desirable spacing between the orifices is between 3/4 inch and 1¼ inches and that the targets are preferably inclined relative to the vertical at an angle $\theta$ of between 35° and 55°. It has also been found that the plane of the faces 78 of the targets 76 should intersect the heat transfer walls 44 along a line located near the intersection of the vertically extending portions 46 and the outwardly extending portions 48.

The frypot 34 may also be equipped with a pair of baffles 84 which are mounted on the walls 44 at points just below the vertically extending lower portions 46. The baffles 84 serve to retard heat transfer from the combustion zone 82 into the lower portion of the frypot 34, and thereby establish a relatively cool zone in the bottom of the frypot. That is, due to the baffles 84, cooking oil or other cooking fluid in the bottom of the frypot 34 is maintained at a substantially lower temperature than the cooking fluid in the upper portion of the frypot. This removes the cooking fluid in the lower portion of the frypot from circulation caused by natural convection due to heating of the oil in the upper portion of the frypot, and therefore allows breading particles and other wastes and residues to settle into the bottom of the frypot without danger of recycling into the upper portion of the frypot. On the other hand, the spacing of the walls 44 of the frypot 34 and the positioning of the drain 40 in the lower portion of the frypot permits the waste materials to be easily cleaned out of the frypot on a periodic basis.

The cooking system 10 further includes a pair of baffles 86 which extend inwardly from the inner panels 20 comprising the firebox 18. The baffles 86 are positioned above the combustion zone 82 and below the outwardly extending portions 48 of the walls 44. The baffles 86 are therefore positioned at points adjacent the paths of products of combustion upwardly along the walls 44, and serve to prevent recycling of the products of combustion into the combustion zone 82. It has been found that if the baffles 86 are omitted from the cooking system 10, the products of combustion will sometimes recycle to such an extent that combustion cannot be maintained in the combustion zone 80.

In the use of a cooking system incorporating the present invention, the frypot is initially filled with a cooking fluid such as shortening or one of the various cooking oils that are commonly employed in deep fat frying. Thereafter, fuel, such as natural gas, propane, LP gas, or the like, is admitted to the gas supply manifold and the burners are initially operated to preheat the cooking fluid to a cooking temperature. Thereafter, the supply of fuel to the gas supply manifold is thermostatically controlled so that the burners function to maintain the cooking fluid at the desired temperature.

After the cooking fluid has been preheated, the cooking system is ready for use in frying. As is well known, frozen foods and other food items are typically supported in heated cooking fluid by means of wire mesh baskets. After the food has been cooked the baskets may be supported above the cooking system for drainage.

During cooking, breading particles and other solid wastes and residues tend to dislodge from the food. Due to the shape of the heat transfer walls of the cooking system, these wastes flow into the bottom of the frypot. The cooking oil in the bottom of the frypot is maintained at a reduced temperature and therefore is not circulated with the high temperature fluid in the upper portion of the frypot. Wastes are therefore permitted to accumulate in the bottom of the frypot without being recirculated into the cooking zone.

From time to time it is necessary to clean the cooking system in order to remove accumulated wastes from the bottom of the frypot. This is accomplished by terminating the supply of fuel to the gas supply manifold. The drain of the frypot is then opened to permit the oil and the wastes to flow outwardly therefrom. Finally, the interior of the frypot is thoroughly cleaned. Cleaning is greatly facilitated in the use of the present invention because the cross sectional configuration of the frypot permits an adult hand to be inserted to the full depth of the frypot. After the frypot has been cleaned, either new or filtered cooking oil is put into the frypot and the foregoing procedure is repeated.

From the foregoing, it will be understood that the cooking system illustrated in the Drawings incorporates several important advantages over prior art systems adapted for frying frozen foods. Thus, the burners of the present cooking system are especially adapted for use in cooking systems and similar applications in that they employ secondary air only for combustion. This is advantageous in that since primary air is not mixed with the gas prior to discharge, the possibility of the air shutters or venturi throats becoming clogged with lint or other particulate materials carried by the air is eliminated. This in turn eliminates the necessity of cleaning air shutters and venturi throats which heretofore has been one of the major maintenance problems associated with burners adapted for use in cooking systems.

One reason for the advantageous characteristics of the burners incorporating the present invention is that at least two gas discharge orifices are utilized in each burner. It will be appreciated that when two or more discharge orifices are incorporated to discharge a given amount of gas, each discharge jet is much smaller in diameter and accordingly much higher in velocity than would be the case if the same amount of gas was discharged from a single orifice. This high velocity together with the positioning of the discharge orifices to cause intersection of the gas/air jets with each other greatly enhances the mixing of the gas with secondary air and thereby eliminates the need of premixing primary air into the fuel before the fuel is discharged.

Another reason that the present burner is capable of operating without primary air is that the targets are positioned in the path of the jets to cause further turbulent mixing of the secondary air and the fuel of the jets. Perhaps more importantly, the targets reflect heat into the combustion zone of the burner. It has been found that this feature of the present invention greatly increases the efficiency of the burner and therefore materially reduces the operating cost of a cooking system incorporating the invention.

A secondary but nevertheless highly favorable advantage of the use of two orifices in a burner is that two connection points are provided for each target. By this means the alignment of the target relative to the orifices is maintained throughout the operation of the burner. If only one orifice is provided, the target can rotate to such an extent that the efficiency of the burner is reduced.

Still another important advantage of the present invention comprises the use of vertically extending heat transfer walls adjacent the combustion zone. It has been found that heat transfer walls having a substantial horizontally extending component are utilized in a cooking system, a boundary layer of heated cooking oil tends to form on the heat transfer walls, whereupon further heat transfer into the cooking fluid is substantially retarded. On the other hand, when the present invention is employed, the boundary layer is continually dissipated by circulation of the cooking fluid due to natural convection, so that a much higher rate of heat transfer into the cooking fluid is achieved.

An associated advantage of the present invention comprises the shape of the heat transfer walls whereby heated products of combustion remain in contact with the side walls for as long as possible. By this means not only the efficiency of heat transfer but also the period of time of heat transfer is greatly extended.

A further advantage to the use of the present invention comprises the shape of the frypot. Thus, in addition to providing very efficient heat transfer to the contents of the frypot, the cross sectional configuration of the frypot shown in the Drawings provides for simplified cleaning of the frypot. This in turn results in both labor savings and the reduction in the amount of time that the cooking system must be out of service for cleaning.

Although a particular embodiment of the invention has been illustrated in the accompanying drawings and described in the foregoing detailed description, it will be understood that the invention is not limited to the embodiment disclosed, but is capable of rearrangement, modification, and substitution of parts and elements without departing from the spirit of the invention.

What is claimed is:

1. A cooking system comprising:
   a container for receiving a quantity of cooking fluid and including at least one heat transfer wall comprising a lower substantially vertically extending portion and an upper generally outwardly extending portion;
   means positioned below the heat transfer wall of the container for discharging a plurality of gas jets in directions such that at least two of said jets together with the air entrained by said two jets at least partially intersect with each other to cause turbulent intermixing of the gas and air, and thereby producing combustion in a zone located adjacent the vertically extending portion of the heat transfer wall; and
   target means positioned in the path of the gas jets for at least partially deflecting the gas jets toward the heat transfer wall, for reflecting heat into the combustion zone, and for radiating heat primarily through the lower substantially vertically extending portion of the heat transfer wall into the cooking fluid whereby heated products of the combustion are directed along the vertically extending and outwardly extending portions of the heat transfer wall and thereby transferring heat through the heat transfer wall primarily through the lower substantially vertically extending portion thereof to the cooking fluid in the container.

2. The cooking system according to claim 1 further including means for admitting secondary air to the region surrounding the gas discharging means.

3. The cooking system according to claim 1 wherein the target means comprises a generally planar surface facing both generally toward the gas jets and toward the vertically extending portion of the heat transfer wall.

4. The cooking system according to claim 1 further including baffle means positioned above the combustion zone and below the outwardly extending portion of the heat transfer wall for preventing recycling of the products of combustion into the combustion zone.

5. The cooking system according to claim 1 further including shield means attached to said heat transfer wall for retarding heat transfer from the combustion zone into a portion of the container located generally below the vertically extending portion of the heat transfer wall and thereby establishing a relatively cool zone in the cooking fluid in the container.

6. A food frying system comprising:
   a frypot for receiving cooking oil and having at least one substantially vertical wall portion;
   a plurality of burners each including;
      a plurality of spaced-apart orifices for discharging separate gas jets in such directions that at least some of the gas flowing in each jet and the air it induces intersects with at least some of the gas flowing from an adjacent jet and the air it induces to cause turbulent mixing of said gas and air, and a target positioned at least partially in the path of the gas jets emanating from the orifices for deflecting the gas jets toward the vertical wall portion and for enhancing turbulent mixing of said gas and air to form a combustible mixture in a combustion zone located generally between said target and said vertical wall portion; and
   means providing a supply of secondary air to each burner for mixing with the gas discharged from the orifices to form said combustible mixture and for combustion with the gas to generate heat in said zone thereby transferring heat through the vertical wall portion to the cooking oil in the frypot.

7. The food frying system according to claim 6 wherein the target of each burner comprises a generally planar surface extending angularly relative to the direction of the jets and facing generally toward the jets and toward the vertical wall portion for reflecting heat into the combustion zone and for radiating infrared energy through the vertical wall portion to the cooking oil in the frypot.

8. The food frying system according to claim 6 wherein the frypot further comprises a wall portion extending generally upwardly and outwardly from the vertical wall portion so that the products of the combustion of the gas and the secondary air flow first along the vertical wall portion and then along the upwardly and outwardly extending wall portion to transfer heat through both wall portions to the cooking oil in the frypot.

9. The food frying system according to claim 8 further including baffle means positioned adjacent the path of travel of the products of combustion along the wall portions for preventing recycling of the products of combustion into the combustion zone.

10. The food frying system according to claim 6 further including means for substantially retarding heat transfer into a portion of the frypot located generally below the vertical wall portion and thereby maintaining a portion of the cooking oil in the frypot at a temperature substantially below the temperature of the remainder of the cooking oil in the frypot.

11. A cooking system comprising:

a. a cooking fluid receiving container including a bottom portion and a pair of opposed walls extending generally upwardly from the bottom portion and each comprising a lower portion extending substantially vertically a substantial distance upwardly from the bottom portion and an upper portion extending generally upwardly and outwardly from the upper end of the lower portion;

b. a plurality of burners positioned at spaced points along the walls of the frypot and each comprising:

means for discharging a pair of gas jets into the ambient air and in such directions that the jets intersect with each other to cause turbulent intermixing of the gas and the air; and target means positioned in the path of the gas jets for at least partially deflecting the jets to cause further turbulent intermixing of the gas and the air;

c. means for retarding heat transfer from the combustion zones to the bottom portion of the container and thereby maintaining cooking fluid in the lower portion of the container at a temperature substantially lower than the temperature of cooking fluid in the upper portion of the container; and d. means for causing heated products of combustion to flow generally upwardly along the vertically extending and along the upwardly and outwardly extending portions of the walls and further including baffle means positioned adjacent the path of the heated products of combustion for preventing recycling of the products of combustion and to the combustion zones.

* * * * *